(12) United States Patent
Decker et al.

(10) Patent No.: US 10,663,581 B2
(45) Date of Patent: May 26, 2020

(54) DETECTION SYSTEMS AND METHODS USING ULTRA-SHORT RANGE RADAR

(71) Applicant: GM Global Technology Operations LLC, Detroit, MI (US)

(72) Inventors: Stephen W. Decker, Clarkston, MI (US); Jeremy P. Gray, Clarkston, MI (US); Igal Bilik, Rehovot (IL); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 353 days.

(21) Appl. No.: 15/648,795

(22) Filed: Jul. 13, 2017

(65) Prior Publication Data
US 2019/0018132 A1    Jan. 17, 2019

(51) Int. Cl.
| | |
|---|---|
| *G01S 13/931* | (2020.01) |
| *B60Q 9/00* | (2006.01) |
| *G01S 13/86* | (2006.01) |
| *B60Q 1/52* | (2006.01) |
| *G01S 13/42* | (2006.01) |
| *G01S 13/04* | (2006.01) |
| *G01S 13/02* | (2006.01) |
| *G01S 13/00* | (2006.01) |

(52) U.S. Cl.
CPC ............ *G01S 13/931* (2013.01); *B60Q 1/525* (2013.01); *B60Q 9/002* (2013.01); *B60Q 9/006* (2013.01); *B60Q 9/008* (2013.01); *G01S 13/04* (2013.01); *G01S 13/42* (2013.01); *G01S 13/867* (2013.01); *G01S 2013/9317* (2013.01); *G01S 2013/93185* (2020.01); *G01S 2013/93271* (2020.01); *G01S 2013/93272* (2020.01); *G01S 2013/93273* (2020.01)

(58) Field of Classification Search
None
See application file for complete search history.

(56) References Cited

U.S. PATENT DOCUMENTS

| | | | | |
|---|---|---|---|---|
| 5,281,949 A | * | 1/1994 | Durley | G01S 13/931 180/167 |
| 5,493,269 A | * | 2/1996 | Durley | G01S 13/931 180/167 |
| 5,995,037 A | * | 11/1999 | Matsuda | G01S 13/931 342/70 |
| 6,018,308 A | * | 1/2000 | Shirai | G01S 13/931 342/118 |

(Continued)

FOREIGN PATENT DOCUMENTS

GB    2356602 A  *  5/2001  ............ B60F 3/0046

*Primary Examiner* — Bernarr E Gregory

(57) ABSTRACT

An ultra-short range radar (USRR) system of a vehicle includes an object detection module configured to, based on radar signals from USRR sensors of the vehicle: identify the presence of an object that is external to the vehicle; determine a location of the object; and determine at least one of a height, a length, and a width of the object. A remedial action module is configured to, based on the location of the object and the at least one dimension of the object, at least one of: selectively actuate an actuator of the vehicle; selectively generate an audible alert via at least one speaker of the vehicle; and selectively generate a visual alert via at least one light emitting device of the vehicle.

18 Claims, 10 Drawing Sheets

(56) References Cited

U.S. PATENT DOCUMENTS

| | | | | |
|---|---|---|---|---|
| 6,052,079 | A * | 4/2000 | Kitahara | G01S 13/931 342/70 |
| 6,073,078 | A * | 6/2000 | Kitahara | G01S 13/931 342/179 |
| 6,266,005 | B1 * | 7/2001 | Schneider | G01S 13/931 342/118 |
| 6,670,912 | B2 * | 12/2003 | Honda | G01S 13/931 180/168 |
| 6,943,727 | B2 * | 9/2005 | Meinecke | G01S 13/931 340/933 |
| 7,126,461 | B2 * | 10/2006 | Takeichi | B60Q 9/006 340/435 |
| 7,650,239 | B2 * | 1/2010 | Samukawa | G01S 17/42 180/169 |
| 7,714,769 | B2 * | 5/2010 | Jordan | G01S 13/931 340/435 |
| 7,839,322 | B2 * | 11/2010 | Filias | G05D 1/0646 340/945 |
| 8,149,158 | B2 * | 4/2012 | Samukawa | G01S 13/931 342/105 |
| 10,351,146 | B2 * | 7/2019 | Prasad | G01S 13/931 |
| 10,393,862 | B2 * | 8/2019 | Cashler | G01S 13/931 |
| 2008/0077327 | A1 * | 3/2008 | Harris | G01S 13/931 701/301 |

* cited by examiner

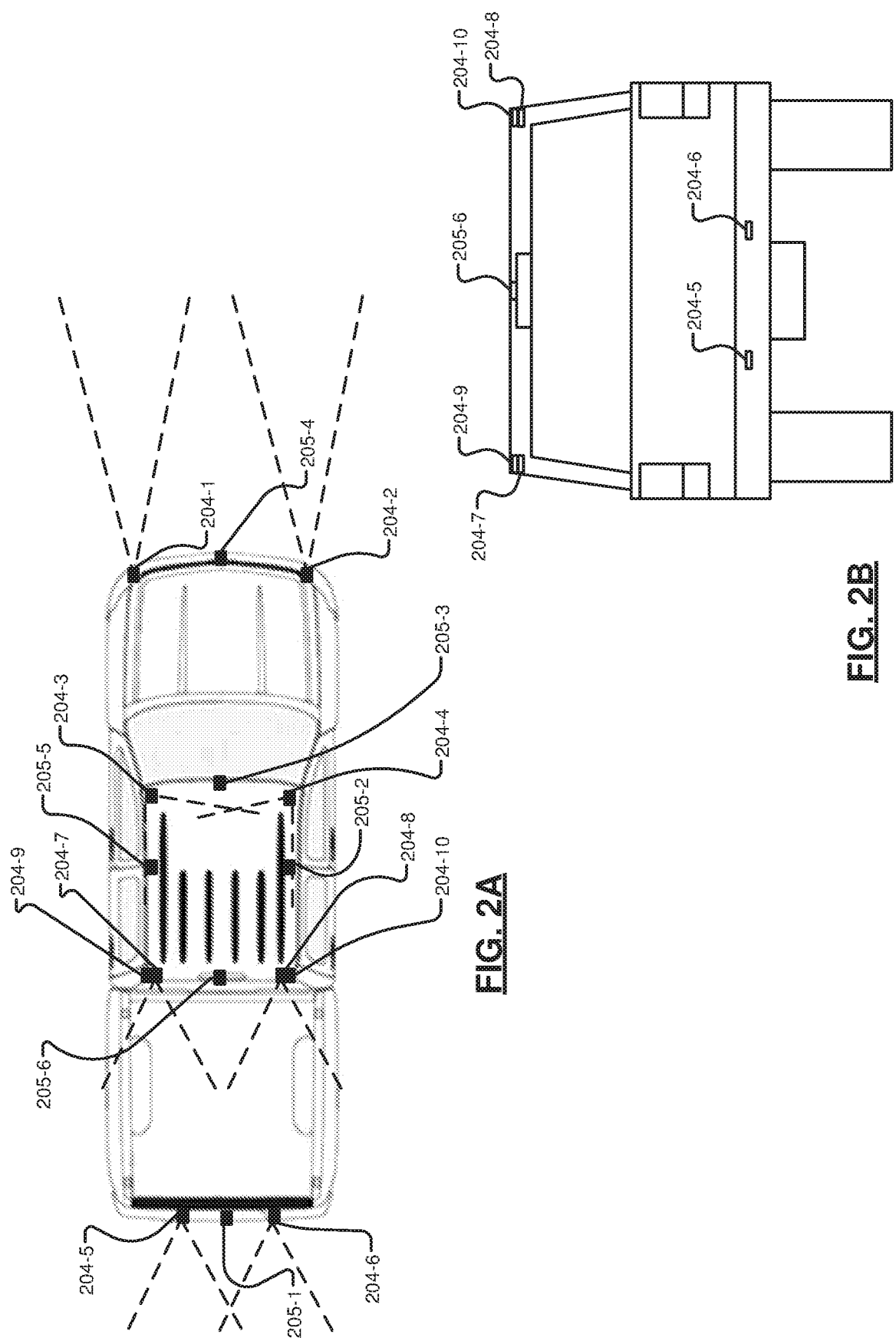

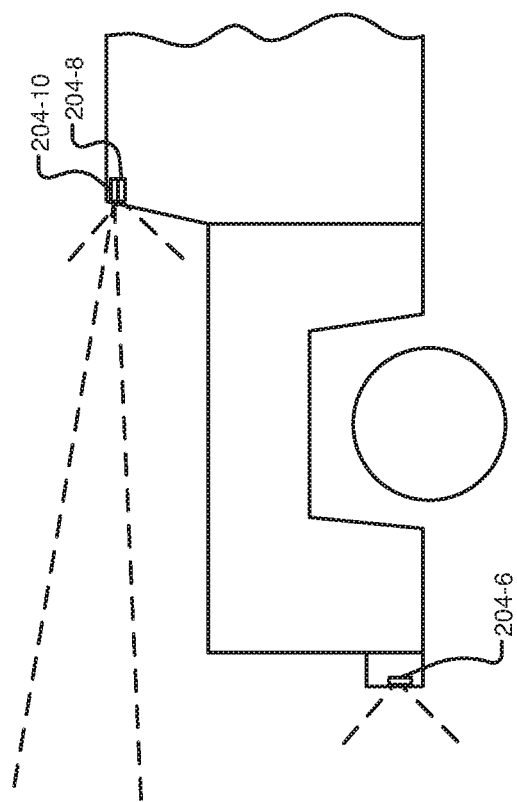

DETECTION SYSTEMS AND METHODS USING ULTRA-SHORT RANGE RADAR

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for detecting the environment surrounding a vehicle in order to minimize the occurrence of collision with objects.

Vehicles include one or more torque producing devices, such as an internal combustion engine and/or an electric motor. A passenger of a vehicle rides within a passenger cabin (or passenger compartment) of the vehicle.

An infotainment system of a vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

SUMMARY

In a feature, an ultra-short range radar (USRR) system of a vehicle is described. An object detection module is configured to, based on radar signals from USRR sensors of the vehicle: identify the presence of an object that is external to the vehicle; determine a location of the object; and determine at least one of a height, a length, and a width of the object. A remedial action module is configured to, based on the location of the object and the at least one dimension of the object, at least one of: selectively actuate an actuator of the vehicle; selectively generate an audible alert via at least one speaker of the vehicle; and selectively generate a visual alert via at least one light emitting device of the vehicle.

In further features: the object is located one of: (i) in a bed of the vehicle; and (ii) on top of a roof of the vehicle; the object detection module is further configured to determine a second height of an overhead object under which the vehicle will pass based on at least one of: the radar signals from the USRR sensors, radar signals from other radar sensors of the vehicle, and images captured using one or more cameras of the vehicle; and the remedial action module is configured to: determine a third height based on the height of the object and a fourth height of the vehicle; and apply one or more brakes of the vehicle when the second height of the overhead object is less than the third height.

In further features the remedial action module is further configured to, when the third height is less than the second height of the overhead object by less than a predetermined amount, at least one of: generate the audible alert via the at least one speaker of the vehicle; and generate the visual alert via the at least one light emitting device of the vehicle.

In further features the object detection module is configured to determine the second height of an overhead object under which the vehicle will pass based on all of: the radar signals from the USRR sensors, the radar signals from other radar sensors of the vehicle, and the images captured using one or more cameras of the vehicle.

In further features: the object detection module is configured to, based on the radar signals from the USRR sensors: determine a first location and a first height of a coupler of a trailer located behind the vehicle; and determine a second location and a second height of a trailer hitch on the vehicle. The remedial action module is configured to, when the first height is less than the second height, at least one of: generate the audible alert via the at least one speaker of the vehicle; and generate the visual alert via the at least one light emitting device of the vehicle.

In further features the remedial action module is configured to, when the first height is greater than the second height, selectively adjust steering and movement of the vehicle and adjust the second location toward the first location.

In further features the remedial action module is configured to apply one or more brakes of the vehicle and stop the vehicle when trailer hitch is directly vertically below the coupler of the trailer.

In further features the remedial action module is configured to, when trailer hitch is directly vertically below the coupler of the trailer, shift a transmission of the vehicle to park.

In further features the remedial action module is configured to, when trailer hitch is directly vertically below the coupler of the trailer and the transmission is in park, at least one of: generate the audible alert via the at least one speaker of the vehicle; and generate the visual alert via the at least one light emitting device of the vehicle.

In further features: the object detection module is configured to determine whether the trailer hitch is present on the vehicle; and the remedial action module is configured to, when the trailer hitch is not present on the vehicle, at least one of: generate the audible alert via the at least one speaker of the vehicle; and generate the visual alert via the at least one light emitting device of the vehicle.

In further features the remedial action module is configured to, when the trailer is hitched to the vehicle and a transmission of the vehicle is in reverse, based on an angle between a first longitudinal axis of the trailer and a second longitudinal axis of the vehicle, at least one of: selectively generate the audible alert via the at least one speaker of the vehicle; and selectively generate the visual alert via the at least one light emitting device of the vehicle.

In further features the remedial action module is configured to, when the angle between the first longitudinal axis and the second longitudinal axis is greater than a first predetermined angle and less than a second predetermined angle, at least one of: generate the audible alert via the at least one speaker of the vehicle; and generate the visual alert via the at least one light emitting device of the vehicle.

In further features the remedial action module is configured to apply one or more brakes of the vehicle and stop the vehicle when angle between the first longitudinal axis and the second longitudinal axis is greater than the second predetermined angle.

In further features the remedial action module is configured to: determine an angular change based on the angle between the first longitudinal axis and the second longitudinal axis and a previous value of the angle; based on the angular change, the angle, and a third predetermined angle that is greater than the second predetermined angle, determine an estimated period until the angle will reach the third predetermined angle; and when the estimated period is less than a predetermined period, at least one of: generate the audible alert via the at least one speaker of the vehicle; and generate the visual alert via the at least one light emitting device of the vehicle.

In further features: the object is located above the vehicle; the remedial action module is configured to, in response to a request to open a vertically opening rear door of the vehicle to a predetermined opening; determine whether the vertically opening rear door will contact the object while the vertically opening rear door is opening to the predetermined opening; and in response to determining that the vertically opening rear door will contact the object while the vertically opening rear door is opening to the predetermined opening, at least one of: generate the audible alert via the at least one speaker of the vehicle; and generate the visual alert via the at least one light emitting device of the vehicle.

In further features the remedial action module is further configured to, in response to determining that the vertically opening rear door will contact the object while the vertically opening rear door is opening to the predetermined opening, not open the vertically opening rear door.

In further features the remedial action module is further configured to, in response to determining that the vertically opening rear door will contact the object while the vertically opening rear door is opening to the predetermined opening, open the vertically opening rear door to an opening that is less than the predetermined opening.

In further features the remedial action module is further configured to: determine whether the object is moving; when the object is moving, whether the vertically opening rear door will contact the object while the vertically opening rear door is opening to the predetermined opening, and in response to determining that the vertically opening rear door will contact the object while the vertically opening rear door is opening to the predetermined opening, at least one of: generate the audible alert via the at least one speaker of the vehicle; and generate the visual alert via the at least one light emitting device of the vehicle.

In a feature, a method includes: based on radar signals from ultra-short range radar (USRR) sensors of the vehicle: identifying the presence of an object that is external to the vehicle; determining a location of the object; and determining at least one of a height, a length, and a width of the object; and based on the location of the object and the at least one dimension of the object, at least one of: selectively actuating an actuator of the vehicle; selectively generating an audible alert via at least one speaker of the vehicle; and selectively generating a visual alert via at least one light emitting device of the vehicle.

In further features the method further includes: based on the radar signals from the USRR sensors: determining a first location and a first height of a coupler of a trailer located behind the vehicle; and determining a second location and a second height of a trailer hitch on the vehicle; when the first height is less than the second height, at least one of: generating the audible alert via the at least one speaker of the vehicle; and generating the visual alert via the at least one light emitting device of the vehicle; and, when the first height is greater than the second height, selectively adjusting at least one of steering and movement of the vehicle, thereby adjusting the second location toward the first location.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-2E are a functional block diagram of views of vehicles including examples of external radar sensors and cameras;

In the drawings, reference numbers may be reused to identify similar and/or identical elements.

DETAILED DESCRIPTION

A vehicle may include cameras, ultra-sonic sensors, radar sensors (e.g., medium and long range), and other types of sensors that identify objects located around the vehicle. These cameras and sensors determine or can be used to determine distances between identified objects and the vehicle.

According to the present disclosure, ultra-short range radar (USRR) sensors additionally sense objects in three-dimensions (length, width, and height) including objects carried on the vehicle and objects located around or above the vehicle. Objects may be carried on the vehicle, for example, in a truck bed or above a passenger cabin of the vehicle.

USRR sensors may be integrated behind the vehicle body/exterior to allow for implementation without altering the outward (exterior) appearance of the vehicle. For example, USRR sensors may be implemented without penetrating the exterior of the vehicle such that no dimples or protrusions are present the exterior of the vehicle for the USRR sensors.

The vehicle may use the signals from USRR sensors in a variety of ways. For example, based on the dimensions of one or more objects carried on the vehicle determined based on the signals from the USRR sensors, an object detection module may determine a new vehicle height that is greater than the height of the vehicle itself. A remedial action module may generate an alert when the vehicle new height (determined based on the dimension(s) of the objects) is greater than a predetermined height such that the object(s) may collide with overhead objects. Additionally or alternatively, the remedial action module may generate an alert and slow or stop the vehicle when the height of an overhead object is less than the vehicle height. This may help prevent a collision between the overhead object and the object(s) carried on the vehicle.

Additionally or alternatively, based on the signals from the USRR sensors, the remedial action module may steer and control movement of the vehicle to position and stop a ball of the vehicle directly under a coupler of a trailer. When the height of the coupler of the trailer is less than the height of the ball of the vehicle, the remedial action module may generate an alert, for example, to indicate that coupling of the trailer with the vehicle is not possible given the current height of the coupler of the trailer.

Additionally or alternatively, based on signals from the USRR sensors, the remedial action module may slow or stop the vehicle to prevent jackknifing of a trailer and the vehicle. jackknifing before jackknifing occurs. Additionally or alternatively, based on the signals from the USRR sensors, the remedial action module may prevent (or minimize) a possibility of contact between a vertically opening rear door (e.g., hatch or liftgate) of a vehicle and one or more objects located on or above the vehicle. Various other uses for signals from USRR sensors may also be possible.

Figure 1:
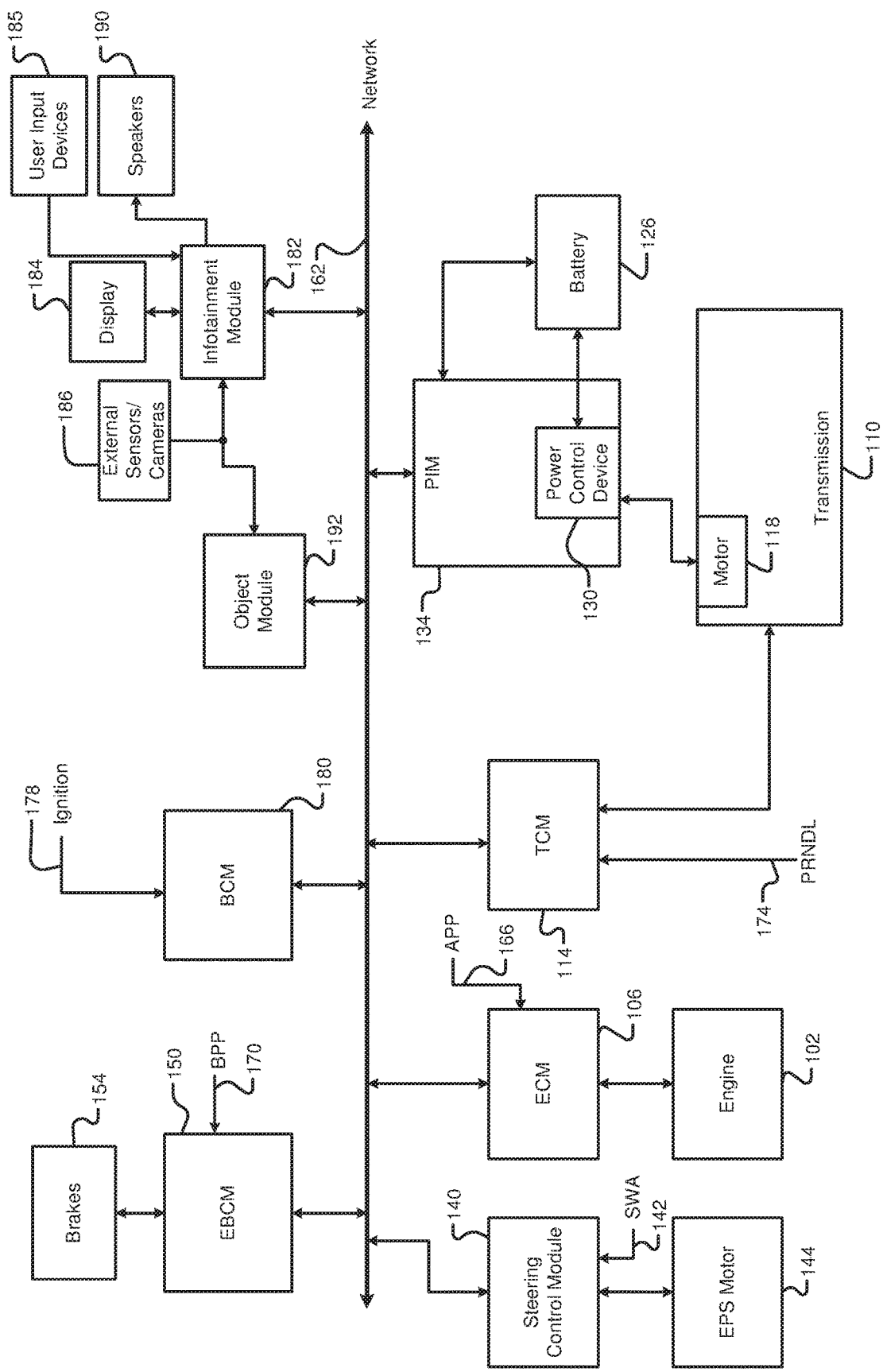
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle analysis modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a network 162, such as a controller area network (CAN). In vehicles, CAN may also stand for car area network. The network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a range selector, such as a park, reverse, neutral, drive lever (PRNDL), may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system also includes an infotainment module 182. The infotainment module 182 controls what is displayed on a display 184. The display 184 may be a touch-screen display in various implementations and transmit signals indicative of user input to the display 184 to the infotainment module 182. The Infotainment module 182 may additionally or alternatively receive signals indicative of user input from one or more other user input devices 185, such as one or more switches, buttons, knobs, etc.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

The infotainment module 182 may also receive input from a plurality of external sensors and cameras, generally illustrated in FIG. 1 by 186. For example, the infotainment module 182 may display video, images, and/or alerts on the display 184 based on input from the external sensors and cameras 186. Examples of the external sensors and cameras 186 are discussed below in FIG. 2.

As discussed further below, an object module 192 selectively generates output (e.g., audible and/or visual) based on input from the external sensors and cameras 186. As also discussed further below, under some circumstances, the object module 192 may adjust one or more actuators of the vehicle based on input from the external sensors and cameras 186.

Figure 2D:
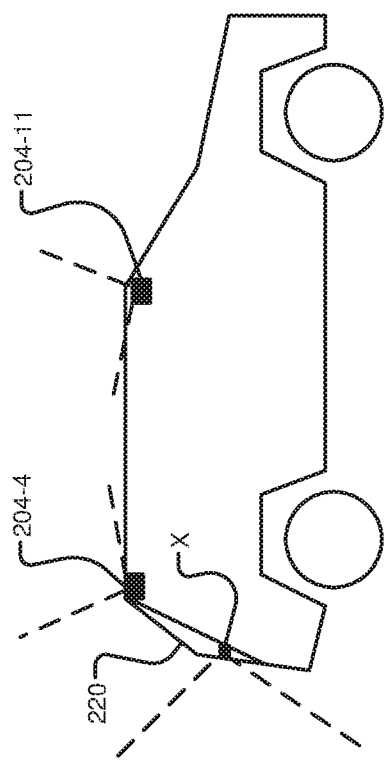
Figure 2E:
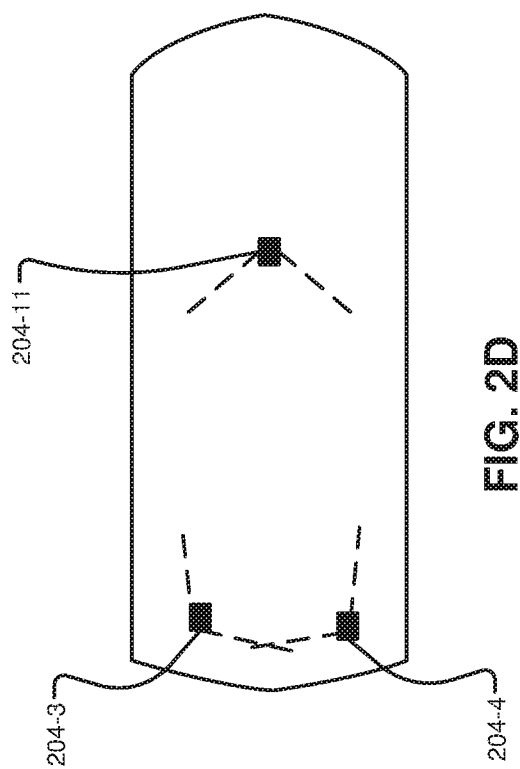

FIG. 2A is a top view of an example vehicle (a truck) including various examples of external radar sensors 204 and cameras 205. FIG. 2B is a rear view of the example vehicle. FIG. 2C is an example partial side view of the vehicle. FIG. 2D is a top view of an example vehicle (a utility vehicle) including various examples of the external radar sensors 204. FIG. 2E is a side view of the example vehicle of FIG. 2D.

Referring now to FIGS. 2A-2E, radar sensors 204-1, 204-2, 204-3, 204-4, 204-5, 204-6, 204-7, 204-8, 204-9, 204-10, 204-11, and 204-12 are collectively referred to as radar sensors 204. Cameras 205-1, 205-2, 205-3, 205-4, 205-5, and 205-6 are collectively referred to as cameras 205. The radar sensors 204 and the cameras 205 are positioned at a variety of positions around the exterior of the vehicle. The different positions for the radar sensors and cameras allow many different data points and images to be collected to ensure that the vehicle environment captured by the radar sensors 204 and the cameras 205 identify and track objects located above and around the exterior of the vehicle.

For example, a forward facing camera 205-3 captures images within a predetermined field of view (FOV) in front of the vehicle. A front camera 205-4 may also capture images and video within a predetermined FOV in front of the vehicle. The front camera 205-4 may capture images and video within a predetermined distance of the front of the vehicle and may be located at the front of the vehicle (e.g., in a front fascia, grille, or bumper). The forward facing camera 205-3 may be located more rearward, such as with a rear view mirror within a windshield of the vehicle. The forward facing camera 205-3 may not be able to capture images and video of items within all of or at least a portion of the predetermined FOV of the front camera 205-4 and may capture images and video that is greater than the predetermined distance of the front of the vehicle. In various implementations, only one of the forward facing camera 205-3 and the front camera 205-4 may be included.

A rear facing camera 205-6 captures images and video of images within a predetermined FOV behind the vehicle. A rear camera 205-1 captures images and video within a predetermined FOV behind the vehicle. The rear camera 205-1 may capture images and video within a predetermined distance behind vehicle and may be located at the rear of the vehicle, such as near a rear license plate. In various implementations, only one of the rear facing camera 205-6 and the rear camera 205-1 may be included.

A right camera 205-2 captures images and video within a predetermined FOV to the right of the vehicle. The right camera 205-2 may capture images and video within a predetermined distance to the right of the vehicle and may be located, for example, under a right side rear view mirror. In various implementations, the right side rear view mirror may be omitted, and the right camera 205-2 may be located near where the right side rear view mirror would normally be located. A left camera 205-5 captures images and video within a predetermined FOV to the left of the vehicle. The left camera 205-5 may capture images and video within a predetermined distance to the left of the vehicle and may be located, for example, under a left side rear view mirror. In various implementations, the left side rear view mirror may be omitted, and the left camera 205-5 may be located near where the left side rear view mirror would normally be located. In various implementations, one or more of the FOVs may overlap, for example, for more accurate and/or inclusive stitching. While examples of the cameras 205 are provided, a greater or fewer number of cameras may be included, and one or more cameras may be located differently.

The radar sensors 204 include ultra-short range radar (USRR) sensors. The radar sensors 204 may also include at least one other type of radar sensor having a longer range, such as medium range radar sensors and/or long range radar sensors. In various implementations, however, the vehicle may only include USRR sensors and not include any short, medium, or long range radar sensors.

For example, forward facing radar sensors 204-1 and 204-2 generate radar signals based on objects within predetermined FOVs in front of the vehicle. In various implementations, the forward facing radar sensors 204-1 and 204-2 may be medium or long range radar sensors. Examples of USRR sensors include AWR1642 mmWave USRR sensors and AWR1443 USRR sensors manufactured by Texas Instruments of Dallas, Tex. USRR sensors have shorter maximum ranges than short, medium, and long range radar sensors. For example, example USRR sensors have maximum ranges of approximately 20 meters.

Upward facing radar sensors 204-3 and 204-4 generate radar signals based on objects within predetermined FOVs above the vehicle, such as within predetermined FOVs in a cargo area above a passenger compartment/cabin of the vehicle. In various implementations, the upward facing radar sensors 204-3 and 204-4 may be USRR sensors. Rear facing radar sensors 204-5 and 204-6 generate radar signals based on objects within predetermined FOVs behind the vehicle. In various implementations, the rear facing radar sensors 204-5 and 204-6 may be USRR sensors. Rear facing radar sensors 204-7 and 204-8 generate radar signals based on objects within predetermined FOVs behind their locations, such as within predetermined FOVs within the bed portion of a truck in the examples of FIGS. 2A-2C. In various implementations, the rear facing radar sensors 204-7 and 204-8 may be USRR sensors. Rear facing radar sensors 204-9 and 204-10 generate radar signals based on objects within predetermined FOVs behind their locations, such as within predetermined FOVs within and behind the bed portion of a truck. In various implementations, the rear facing radar sensors 204-9 and 204-10 may be medium or long range radar sensors.

While examples of the USRR sensors 204 are provided, a greater or fewer number of USRR sensors may be included, and one or more USRR sensors may be located differently. For example, as shown in FIGS. 2D and 2E, upward facing radar sensor 204-11 generates radar signals based on objects within a predetermined FOV above the vehicle, such as within a predetermined FOV in the cargo area above the passenger compartment/cabin of the vehicle. In various implementations, the upward facing radar sensor 204-11 may be a USRR sensor. As shown in FIG. 2E, radar sensor 204-12 may be implemented near a bottom of a vertically opening rear door 220 of a vehicle. The radar sensor 204-12 may be a USRR sensor and may be used, for example, to prevent collisions between the vertically opening rear door and one or more objects located above the vehicle. The radar sensor 204-12 generates radar signals based on objects within a predetermined FOV behind the vehicle when the vertically opening rear door is closed. The predetermined FOV of the radar sensor 204-12 is tilted upwards as the vertically opening rear door opens.

Each radar sensor outputs signals within a predetermined FOV around the exterior of the vehicle and generates an output (radar) signals based on signals reflected back to that radar sensor by objects within the predetermined FOV. Example FOVs for the radar sensors 204 are illustrated in FIGS. 2A-2E although the FOVs may be different. Each FOV has dimensions in at least two dimensions, such as both a vertical component and a horizontal component.

Figure 3:
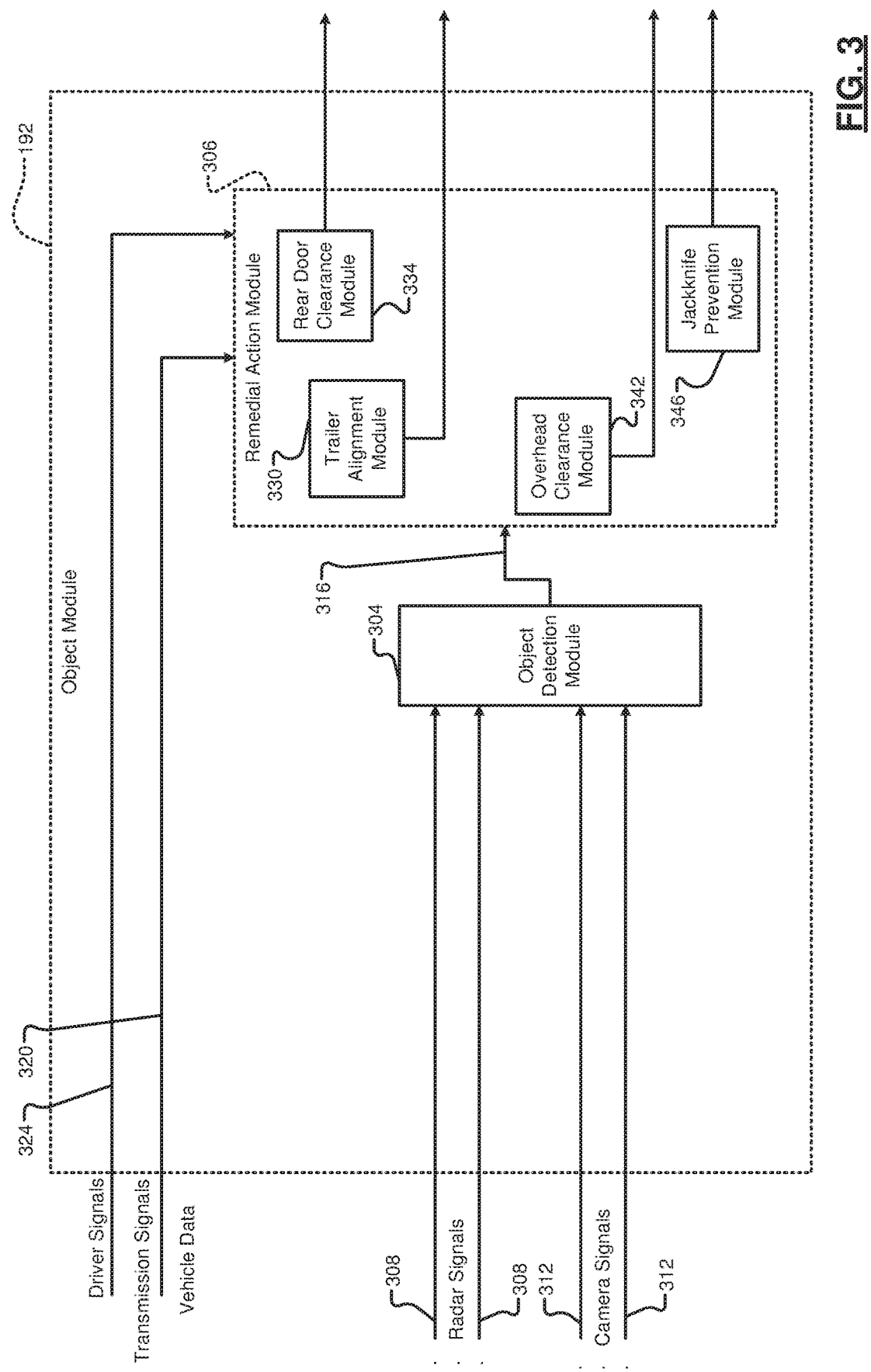
FIG. 3 is a functional block diagram of an example of an environment detection module of a vehicle.

FIG. 3 is a functional block diagram of an example implementation of the object module 192. The object module 192 includes an object detection module 304 and a remedial action module 306.

The object detection module 304 receives radar signals 308 and camera signals 312 from various ones of the radar sensors 204 and the cameras 205. The object detection module 304 determines object tracking information 316 based on the radar and camera signals and provides the object tracking information 316 to the remedial action module 306. The object tracking information 316 includes, for each object located around the vehicle and for each objected located on the vehicle (e.g., on top of the vehicle, within the cargo area of the vehicle, etc.), a size of the object, coordinates of the object, a location of the object, a speed of movement of the object, a classification and type of the object, and information regarding separation between objects.

The object detection module 304 may generate the object tracking information 316 based on the radar and camera signals 308 and 312 using a sensor fusion algorithm. The sensor fusion algorithm may include first a direct current (DC) removal algorithm, a first windowing algorithm, a first Fourier Transform (FT) algorithm (e.g., a fast Fourier Transform (FFT) algorithm), a second windowing algorithm, a second FT algorithm (e.g., a second FFT algorithm) and a first object detection algorithm that identifies objects based on the data resulting from the second FT algorithm. The DC removal algorithm, the first windowing algorithm, the first FT algorithm, the second windowing algorithm, the second FT algorithm, and the first object detection algorithm may be executed in that order. The sensor fusion algorithm may also include a Doppler correction algorithm that corrects data resulting from the first object detection algorithm, a transceiver decoding algorithm, a beamforming algorithm, and a second object detection algorithm detection that identifies objects based on the data resulting from the beamforming algorithm. The Doppler correction algorithm, the transceiver decoding algorithm, the beamforming algorithm, and the second object detection may be executed in that order. The sensor fusion algorithm may also include a Doppler synthetic aperture radar (SAR) algorithm that sharpens data resulting from the second object detection algorithm, a clustering algorithm, and a tracking algorithm that tracks the objects based on the data resulting from the clustering algorithm. The Doppler SAR algorithm, the clustering algorithm, and the tracking algorithm may be executed in that order to obtain radar processed data.

The sensor fusion algorithm may also include a projection algorithm that projects objects from the radar processed data onto one or more planes (e.g., horizontal planes) of one or more of the cameras 205, respectively, and combines the projections with the images from the cameras 205, respectively. The sensor fusion algorithm may also include a combining algorithm that combines region of interest (ROI) generation algorithm that identifies ROIs in the combined data. The sensor fusion algorithm may also include a verification and classification algorithm that verifies object presence and classifies as a classification and type of object.

The remedial action module 306 receives the object tracking information 316, transmission signals 320 from the TCM 114, and driver signals 324 from various control modules within the vehicle including: the steering control module 140, the ECM 106, and the EBCM 150. Based on the object tracking information 316 and other received data, the remedial action module 306 performs one or more operations. Example operations include aligning a ball (or other receiver) of the vehicle with a coupler of a trailer for towing of the trailer, preventing collision between objects on or above the vehicle (e.g., in the bed of the truck or on top of the vehicle) with overhead objects (e.g., branch, bridge, sign, etc.) or with a vertically opening rear door (e.g., liftgate or hatch) of the vehicle, and aiding prevention of jackknifing of a trailer that is hitched to the vehicle.

The remedial action module 306 may take one or more actions for performance of an operation. For example, for the alignment of the ball with the coupler of a trailer, the remedial action module 306 may generate an alert (e.g., an audible and/or visual alert) if a height of the ball is greater than a height of the coupler of the trailer (such that the trailer could not be hitched to the vehicle). When the height of the ball is less than the height of the coupler of the trailer, the remedial action module 306 may steer the vehicle and control the approach speed of the vehicle to position and stop the ball of the vehicle directly (vertically) under the coupler of the trailer. When the ball of the vehicle is directly (vertically) under the coupler of the trailer, the remedial action module 306 may stop the vehicle, shift the transmission 110 to park, and generate an alert (e.g., audible and/or visual) that trailer is in position to be hitched to the vehicle.

As another example, for preventing a collision between objects on the vehicle (e.g., in the bed of the truck or on top of the vehicle) with overhead objects, the remedial action module 306 may determine a vehicle height based on the height of the vehicle and the height of objects carried on the vehicle. When the vehicle height is greater than a height of an overhead object under which the vehicle is directed to travel, the remedial action module 306 may perform braking to prevent a collision between on object on the vehicle and the overhead object. When the vehicle height is less than the height of all overhead objects but is greater than a predetermined height, the remedial action module 306 may generate an alert (e.g., audible and/or visual) to alert the driver to the possibility that one or more objects on the vehicle may collide with overhead objects.

As another example, for preventing a collision between objects on top of the vehicle or above with a vertically opening rear door of the vehicle, when a request to open the vertically opening rear door is received, the remedial action module 306 may determine whether one or more objects located on or above the vehicle will collide with the vertically opening rear door before the vertically opening rear door reaches a maximum opening position. When one or more objects located on or above the vehicle will collide with the vertically opening rear door, the remedial action module 306 generates an alert (e.g., audible and/or visual) to alert the driver to the possibility of such a collision. The remedial action module 306 may also disable opening of the vertically opening rear door or open the vertically opening rear door to a lesser extent (than the maximum opening position) to prevent a collision.

As another example, for preventing jackknifing when a trailer is hitched to the vehicle, the remedial action module 306 determines an angle between a longitudinal axis of the trailer and a longitudinal axis of the vehicle. The remedial action module 306 also determines a rate of increase of the angle and, based on the rate of increase, determines an estimated period until the trailer will be jackknifed and will collide with the vehicle. When the estimated period is less than a predetermined period, the remedial action module 306 may brake the vehicle (e.g., via the brakes 154) to slow or stop the vehicle to prevent jackknifing. When the estimated period is greater than the predetermined period, the remedial action module 306 may generate an alert (e.g., audible and/or visual) when the angle is increasing and the angle is within a predetermined amount (angle) of a predetermined angle where jackknifing will occur. Audible alerts may be generated via one or more speakers of the vehicle. Visual alerts may be generated via one or more lights of the vehicle and/or one or more displays of the vehicle.

Figure 4:
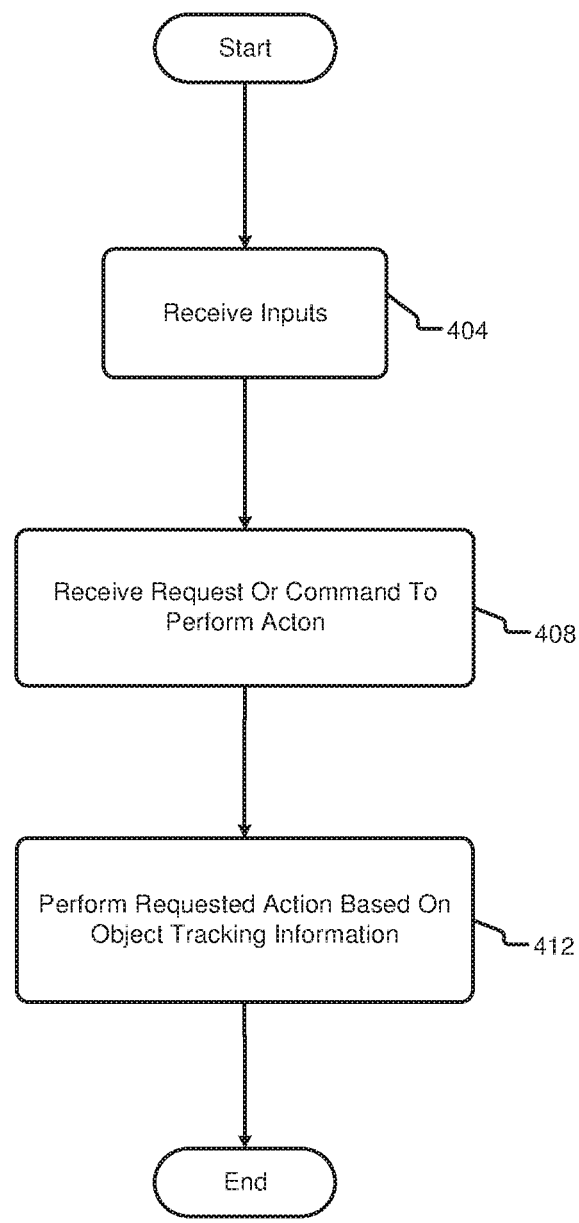
FIG. 4 is a flowchart depicting an example method of analyzing an environment around a vehicle.

FIG. 4 is a flowchart that shows the method of analyzing an environment around a vehicle based on the radar and camera signals 308 and 312 from the radar sensors 204 and the cameras 205. At 404, the object detection module 304 receives the radar and camera signals 308 and 312 from the radar sensors 204 and the cameras 205. The object detection module 304 determines the object tracking information 316 based on the radar and camera signals 308 and 312.

At 408, the remedial action module 306 receives an input triggering performance of an operation. For example, the remedial action module 306 may receive an input indicative of a trailer being hitched to the vehicle and the transmission 110 being in a reverse gear. As another example, the remedial action module 306 may receive input indicative of the transmission 110 being in a reverse gear and a request to align a trailer with the vehicle (or a trailer coupler is identified behind the vehicle). As yet another example, the remedial action module 306 may receive input indicative of a request to open the vertically opening rear door. As yet another example, the remedial action module 306 may receive input indicative of the transmission 110 being in a forward gear and one or more objects are being carried on the vehicle. As yet another example, the remedial action module 306 may receive input indicative of a height of the vehicle (including one or more objects carried on the vehicle) being greater than a predetermined maximum height.

At 412, the remedial action module 306 performs remedial action(s) for the operation. For example, the remedial action module 306 may steer and control movement of the vehicle based on the radar and camera signals 204 and 208 to position the ball of the vehicle under the coupler of a trailer. The remedial action module 306 may generate an alert when the height of the ball of the vehicle is greater than the height of the coupler of the trailer. As another example, the remedial action module 306 may generate an alert and/or brake the vehicle to prevent jackknifing. As another example, the remedial action module 306 may generate an alert and/or slow or stop the vehicle when a height of the vehicle (including objects carried on the vehicle) is greater than a predetermined height or greater than a height of an overhead object. As another example, the remedial action module 306 may generate an alert and/or prevent or limit opening of a vertically opening rear door when the vertically opening rear door would collide with one or more objects carried on the vehicle. While the example of FIG. 4 is shown as ending, the example of FIG. 4 may be illustrative of one control loop and control may return to 404.

Figure 5:
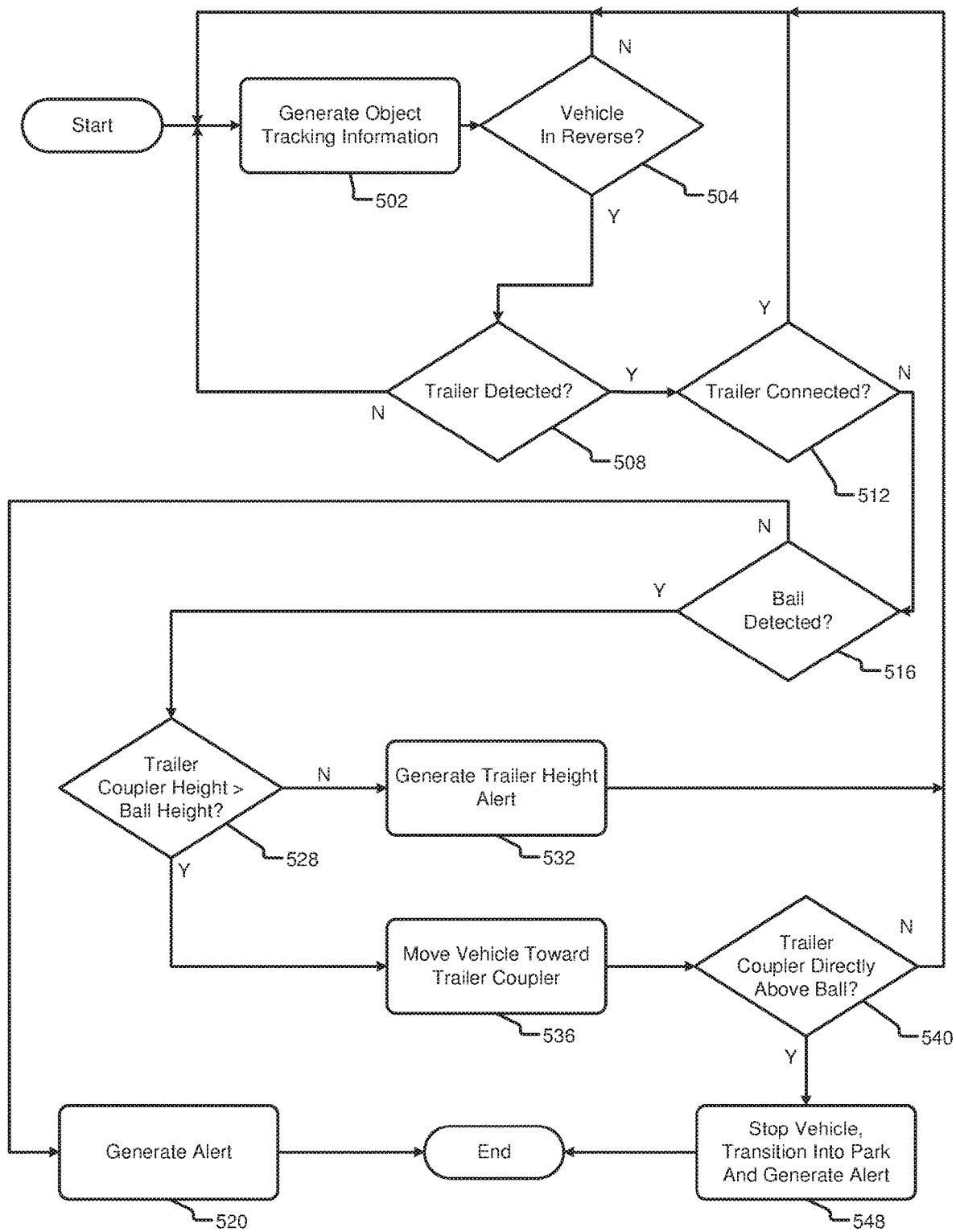
FIG. 5 is flowchart depicting an example method involving aligning a trailer with a trailer hitch of a vehicle.

FIG. 5 is a flowchart depicting an example method of providing alerts and aligning a trailer coupler with a ball of a vehicle. Control may begin with 502 where the object detection module 304 generates the object tracking information 316 based on the radar signals 308 and/or the camera signals 312. At 504, a trailer alignment module 330 (see FIG. 3) determines whether the transmission 110 is in a reverse gear. If 504 is false, control returns to 502. If 504 is true, control may continue with 508.

At 508, the trailer alignment module 330 may determine whether a trailer has been detected behind the vehicle based on the object tracking information 316. If 508 is true, control continues with 512. If 508 is false, control may return to 502. At 512, the trailer alignment module 330 may determine whether the trailer is already connected to the vehicle. For example, the trailer alignment module 330 may determine whether the coupler of the trailer is already mated with the ball (or other coupler) of the vehicle based on the object tracking information 316. If 512 is true, control may return to 502. If 512 is false, control may continue with 516.

At 516, the trailer alignment module 330 may determine whether a ball (or other coupler) is present on the vehicle based on the object tracking information 316. The object detection module 304 detects the presence of the ball of the vehicle based on various ones of the radar signals 308 and the camera signals 312. The object detection module 304 also determines a distance between the trailer coupler and the vehicle, the height of the trailer coupler (e.g., relative to the ground surface), and other data based on various ones of the radar signals 308 and the camera signals 312. The object detection module 304 also determines a location of the ball of the vehicle, a height of the ball (e.g., relative to the ground surface), and other data based on various ones of the radar signals 308 and the camera signals 312. If 516 is false, the trailer alignment module 330 may generate an alert (e.g., audible and/or visual) at 520, and control may end. The alert may indicate, for example, that the trailer alignment module 330 is unable to identify the ball and/or that the trailer alignment module 330 is presently unable to align the ball with the coupler of the trailer. If 516 is true, control continues with 528.

At 528, the trailer alignment module 330 may determine whether the height of the trailer coupler is greater than the height of the ball of the vehicle. If 528 is false, the trailer alignment module 330 may generate an alert (e.g., audible and/or visual) at 532 and control may return to 502. Additionally at 528, the trailer alignment module 330 may stop or slow the vehicle (e.g., apply the brakes 154 via the EBCM 150) at 532. The alert may indicate that coupling of the trailer coupler with the ball may not be possible based on the height of the trailer coupler. If 528 is true, control may continue with 536. At 536, the trailer alignment module 330 may regulate movement of the vehicle to adjust the ball of the vehicle toward the coupler of the trailer. For example, the trailer alignment module 330 may slow the vehicle (e.g., apply the brakes 154 via the EBCM 150), actuate the EPS motor 144 (via the steering control module 140) to steer the ball left or right, etc. Alternatively, the trailer alignment module 330 may generate visual and/or audible indicators (e.g., indicators to steer left, right, or straight) to aid the driver in moving the ball of the vehicle toward the coupler of the trailer at 536. In this case, the driver may control movement of the vehicle.

At 540, the trailer alignment module 330 determines whether the coupler of the trailer is directly (vertically) above the ball of the vehicle. If 540 is false, control may return to 502. If 540 is true, the trailer alignment module 330 may stop the vehicle (e.g., apply the brakes 154 via the EBCM 150) and shift the transmission 110 to park (via the TCM 114) at 548, and control may end. The trailer alignment module 330 may also generate an alert (e.g., audible and/or visual) at 548 to alert the driver to the completion of the alignment of the ball of the vehicle under the coupler of the trailer. While the example of FIG. 5 is shown as ending, the example of FIG. 5 may be illustrative of one control loop and control may return to 502.

Figure 6:
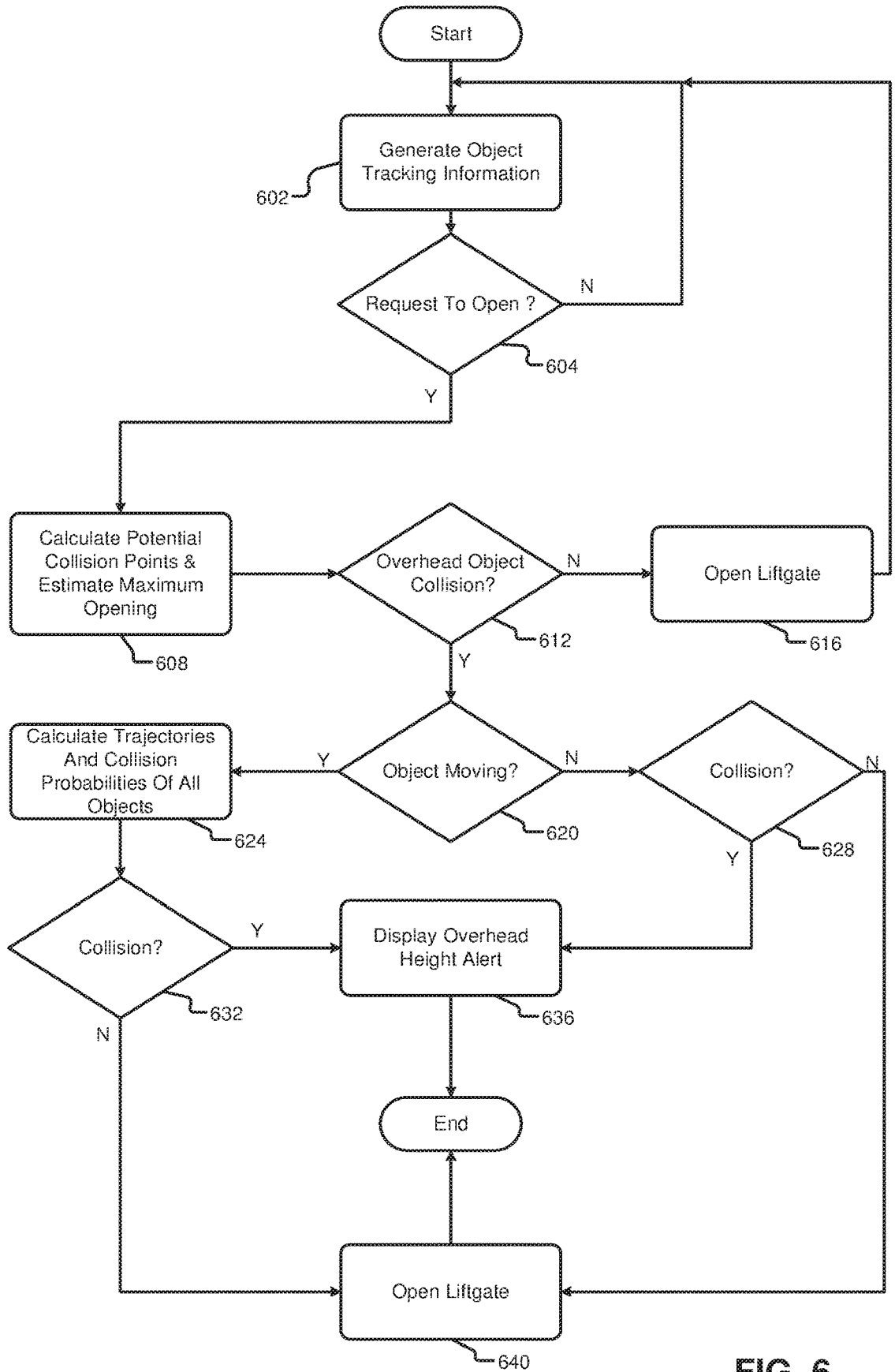
FIG. 6 is flowchart depicting an example method of controlling opening of a vertically opening rear door of a vehicle.

FIG. 6 is a flowchart depicting an example method of managing opening of a vertically opening rear door. Control may begin with 602 where the object detection module 304 generates the object tracking information 316 based on the radar signals 308 (e.g., radar signals from the radar sensors 204-3, 204-4, 204-12) and/or the camera signals 312. At 604, a rear door clearance module 334 determines whether input indicative of a request to open a vertically opening rear door (e.g., liftgate or a hatch door) has been received. An example vertically opening rear door, such as a vertically opening rear door is illustrated in FIG. 2E by 220. If 604 is true, control continues with 608. If 604 is false, control returns to 602.

At 608, the rear door clearance module 334 may determine whether one or more objects are located on top of the vehicle or (presently) above the vehicle based on the object tracking information 316. The rear door clearance module 334 may also determine whether the vertically opening rear door would collide with the one or more objects if opened to a predetermined maximum opening (or a user set opening) of the vertically opening rear door and, if so, one or more openings of the vertically opening rear door where the collision(s) would occur. The rear door clearance module 334 determines the openings where collisions, respectively, would occur based on the locations of the objects indicated in the object tracking information 316 and the known physical trajectory and dimensions of the vertically opening rear door.

At 612, the rear door clearance module 334 determines whether one or more collisions would occur if the determination is that the vertically opening rear door would collide with the one or more objects if opened to the predetermined maximum opening (or the user set opening) of the vertically opening rear door. If 612 is false, the rear door clearance module 334 does not generate an alert and begins opening the vertically opening rear door to the predetermined maximum opening (or the user set opening) of the vertically opening rear door at 616, and control returns to 602. As an alternative, the rear door clearance module 334 may allow opening of the vertically opening rear door without generating an alert at 616. If 612 is true, control continues with 620.

At 620, the rear door clearance module 334 determines whether one or more of the objects that are on top of or above the vehicle are moving based on the object tracking information 316. For example, the rear door clearance module 334 may determine whether the locations of one or more of the objects have changed. If 620 is true, control transfers to 624, which is discussed further below. If 620 is false, at 628 the rear door clearance module 334 again determines whether the vertically opening rear door would collide with one or more of the objects if opened to the predetermined maximum opening (or the user set opening). If 628 is false, the rear door clearance module 334 continues to open the vertically opening rear door at 640, and control may end. If 628 is true, the rear door clearance module 334 generates an alert (e.g., audible and/or visual) at 636, and control may end. The rear door clearance module 334 may also stop opening the vertically opening rear door. The alert may indicate that the vertically opening rear door will collide with one or more of the objects located on top of or over the vehicle if the vertically opening rear door is opened to the predetermined maximum opening (or the user set opening).

Referring back to 624 (when one or more of the objects located on top of or over the vehicle are moving), the rear door clearance module 334 determines a trajectory and a collision probability for each of the one or more objects that are moving based on the object tracking information 316. For example, the rear door clearance module 334 may determines a trajectory based on a change in location of the object over time (e.g., a line drawn through two locations of the object). The rear door clearance module 334 may determine a probability of collision, for example, based on a speed of movement of the object, the trajectory of the object, and locations of the vertically opening rear door is opened to the predetermined maximum opening (or the user set opening).

At 632, the rear door clearance module 334 may determine whether one or more of the (moving) objects may collide with the vertically opening rear door. For example, the rear door clearance module 334 may determine whether the probability of collision of one or more of the objects is greater than a predetermined probability (e.g., 50 percent or another suitable probability). If 632 is true, the rear door clearance module 334 generates an alert (e.g., audible and/or visual) at 636, and control may end. The rear door clearance module 334 may also stop opening the vertically opening rear door. The alert may indicate that the vertically opening rear door will collide with one or more of the objects located on top of or over the vehicle if the vertically opening rear door is opened to the predetermined maximum opening (or the user set opening). While the example of FIG. 6 is shown as ending, the example of FIG. 6 may be illustrative of one control loop and control may return to 602.

Figure 7:
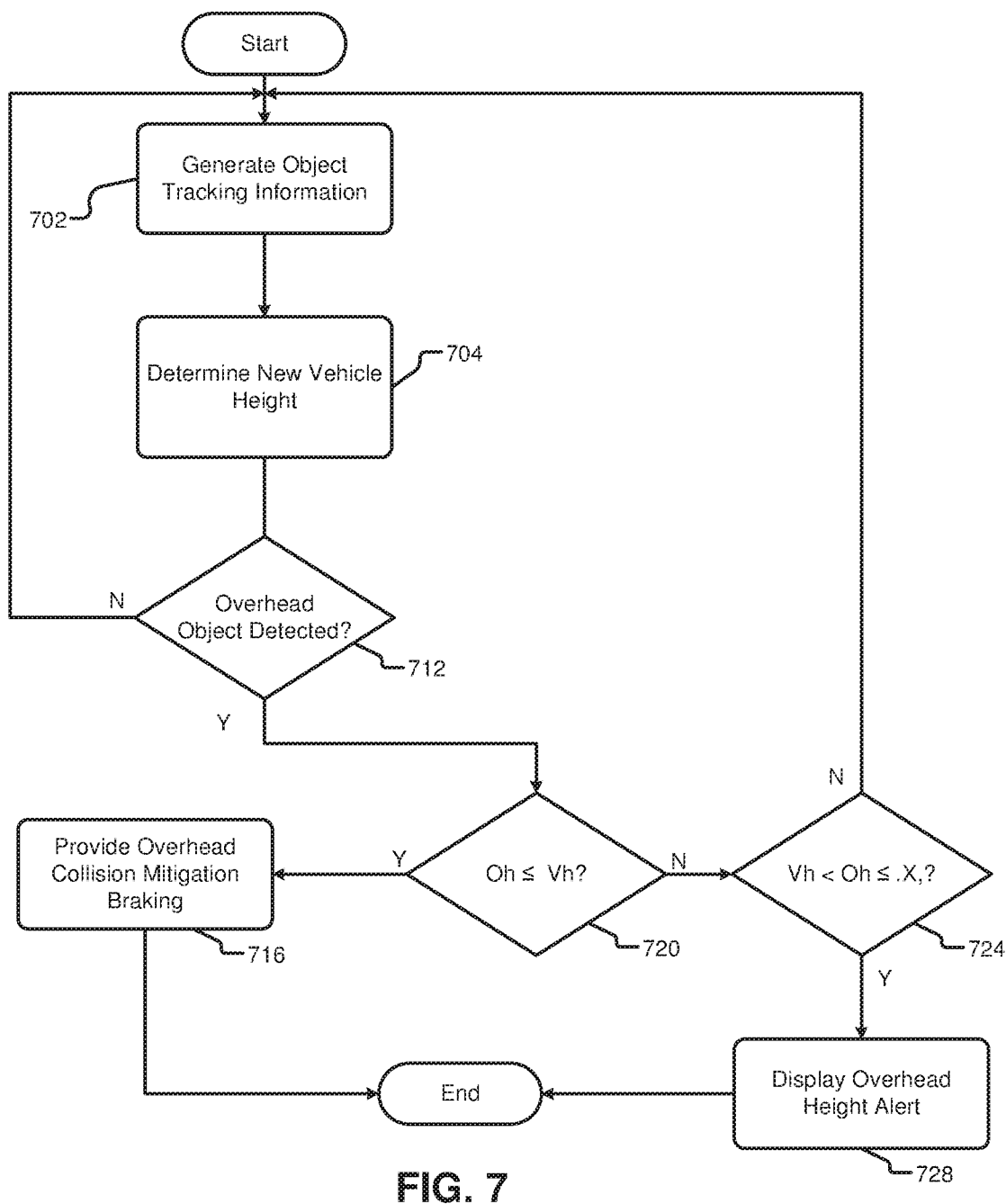
FIG. 7 is flowchart depicting an example method involving overhead object height detection.

FIG. 7 is a flowchart including an example method for minimizing a risk of a collision between overhead objects and one or more objects carried on the vehicle. Control begins with 702 where the object detection module 304 generates the object tracking information 316 based on the radar signals 204 (e.g., only the radar signals 204 from the USRR sensors). The object detection module 304 may generate the object tracking information 316 further based on the radar signals 204 from other types of radar sensors and/or the camera signals 205. As discussed above, the object tracking information 316 includes heights of one or more objects carried on the vehicle.

At 704, based on the heights of the vehicle in the locations where the objects are carried on the vehicle and the heights of the vehicle at the locations, respectively, an overhead clearance module 342 determines a new vehicle height. For example, for each one or more object that is carried on the vehicle (e.g., above the vehicle or in the bed of a truck), the overhead clearance module 342 may determine an initial height. The overhead clearance module 342 may determine the initial height of an object carried on the vehicle based on a sum of (i) the height of the object included in the object tracking information 316; and (ii) a predetermined height of the vehicle at the location of the object. The overhead clearance module 342 may determine an initial height for each object carried on the vehicle. The overhead clearance module 342 may set the new vehicle height based on or equal to a largest (maximum) one of the initial vehicle heights. When there are no objects carried on the vehicle, the overhead clearance module 342 may set the new vehicle height to a predetermined maximum height of the vehicle.

In various implementations, before the vehicle is moving (e.g., when the vehicle is turned on and is in park or when the transmission is transitioned from park to a forward drive gear or a reverse gear), the overhead clearance module 342 may generate an alert (e.g., audible and/or visual) when the new vehicle height is greater than a predetermined height. The alert may indicate to the driver that, due to the height of the object(s) carried on the vehicle, the objects may collide with one or more overhead objects while the vehicle is moving.

In various implementations, control continues with 712. At 712, the overhead clearance module 342 determines whether an overhead object is present in the direction of travel of the vehicle (e.g., in front of the vehicle when the vehicle is in a forward drive gear or behind the vehicle when the vehicle is in a reverse gear). The overhead clearance module 342 may determine whether an overhead object is present and indicated in the object tracking information 316. When an overhead object is present, the object tracking information 316 also includes a height of the overhead object and other information regarding the overhead object. If 712 is true, control continues with 720. If 712 is false, control may return to 702.

At 720, the overhead clearance module 342 determines whether the height of the overhead object (Oh) is less than or equal to the new vehicle height (Vh). If 720 is true, at 716 the overhead clearance module 342 may apply the brakes 154 (e.g., via the EBCM 150) to slow or stop the vehicle. The overhead clearance module 342 may also generate an alert (e.g., audible and/or visual) when the new vehicle height is greater than the height of the overhead object. If 720 is false, control transfers to 724.

At 724, the overhead clearance module 342 may determine whether the new vehicle height (Vh) is less than the height of the overhead object (Oh) by less than a predetermined distance. If 724 is true, the overhead clearance module 342 may generate an alert (e.g., audible and/or visual) at 728 and control may end. If 724 is false, control may return to 702. The predetermined distance may be calibratable and may be set, for example, 0.25 meters, less than 0.25 meters, or another suitable value. While the example of FIG. 7 is shown as ending, the example of FIG. 7 may be illustrative of one control loop and control may return to 702.

Figure 8:
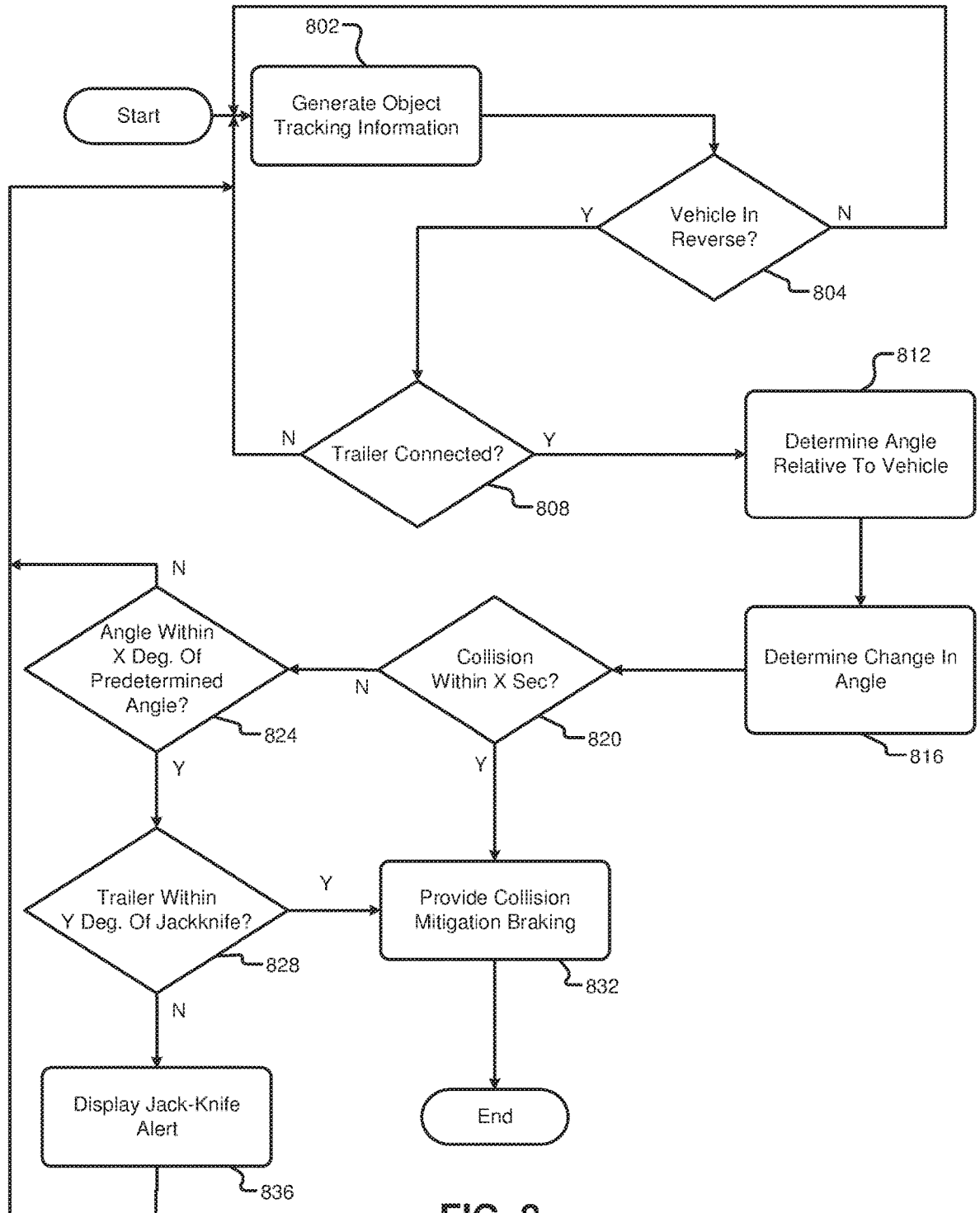
FIG. 8 is flowchart depicting a method of preventing jackknifing of a vehicle and a trailer.

FIG. 8 is a flowchart illustrating an example method of preventing jackknifing (collision) between a trailer and a vehicle. Control begins with 802 where the object detection module 304 generates the object tracking information 316 based on the radar signals 204 (e.g., only the radar signals 204 from the USRR sensors). The object detection module 304 may generate the object tracking information 316 further based on the radar signals 204 from other types of radar sensors and/or the camera signals 205. As discussed above, the object tracking information 316 includes locations of (e.g., a linear equation corresponding to) a longitudinal axis of a trailer and indicator of whether the trailer is connected to the vehicle (e.g., the coupler of the trailer is connected to the ball of the vehicle), and other information.

At 804, a jackknife prevention module 346 (see FIG. 3) determines whether the transmission 110 is in a reverse gear. For example, the TCM 114 may indicate whether the transmission 110 is in a reverse gear. If 804 is true, control may continue with 808. If 804 is false, control may return to 802.

At 808, the jackknife prevention module 346 determines whether the trailer is connected to the vehicle, such as based on the object tracking information 316. If 808 is true, control continues with 812. If 808 is false, control may return to 802. At 812, the jackknife prevention module 346 determines an angle between a longitudinal axis of the vehicle and the longitudinal axis of the trailer. For example, the longitudinal axis of the vehicle may be a predetermined axis (e.g., a linear equation) and the longitudinal axis of the trailer may be determined by the object detection module 304 relative to the predetermined axis of the vehicle. For example, the jackknife prevention module 346 may determine the slopes from the linear equation for the trailer and the linear equation for the vehicle, determine the arctangents of each slope to determine the angle of inclination of each of the lines, subtract the two angles of inclination, and solve for the smallest (acute) angle. The smallest angle may be the angle between the longitudinal axis of the vehicle and the longitudinal axis of the trailer. An angle of 0 may correspond to the longitudinal axis of the trailer being aligned (and straight behind) the longitudinal axis of the trailer.

At 816, the jackknife prevention module 346 determines a change in the angle between the longitudinal axis of the vehicle and the longitudinal axis of the trailer. For example, the jackknife prevention module 346 may set the change based on a difference between the angle between the longitudinal axis of the vehicle and the longitudinal axis of the trailer angle (determined at 812) and a previous value of the angle between the longitudinal axis of the vehicle and the longitudinal axis of the trailer (determined at a previous instance of 812).

The jackknife prevention module 346 may also determine a rate of change of the angle, for example, based on the change over (divided by) the period between the angle and the previous value of the angle. The jackknife prevention module 346 may determine a period until a collision (i.e., jackknifing) will occur between trailer and the vehicle based on the angle, a predetermined angle where a collision will occur, and the rate of change of the angle. For example, the jackknife prevention module 346 may set the period until a collision will occur between the trailer and the vehicle based on or equal to a difference divided by the rate of change where the difference is a difference between the angle and the predetermined angle.

At 820, the jackknife prevention module 346 may determine whether the period until a collision will occur between the trailer and the vehicle is less than a predetermined period. The predetermined period may be calibratable and may be approximately 2 seconds or another suitable period. If 820 is true, the jackknife prevention module 346 may apply the brakes 154 (e.g., via the EBCM 150) to slow or stop the vehicle at 832 and control may end. The jackknife prevention module 346 may also generate an alert (e.g., audible and/or visual) when the period is less than the predetermined period. If 820 is false, control transfers to 824.

At 824, the jackknife prevention module 346 determines whether a difference between the angle and the predetermined angle is less than a first predetermined difference angle. In various implementations, the jackknife prevention module 346 may determine whether the angle is within the first predetermined difference angle of the predetermined angle. If 824 is true, the jackknife prevention module 346 may apply the brakes 154 (e.g., via the EBCM 150) to slow or stop the vehicle at 832 and control may end. The jackknife prevention module 346 may also generate an alert (e.g., audible and/or visual) when the difference between the angle and the predetermined angle is less than the first predetermined difference angle. The first predetermined difference angle may be calibratable and may be approximately 20 degrees or another suitable angle. If 824 is false, control continues with 828.

At 828, the jackknife prevention module 346 determines whether the difference between the angle and the predetermined angle is less than a second predetermined difference angle that is less than the first predetermined difference angle. In various implementations, the jackknife prevention module 346 may determine whether the angle is within the second predetermined difference angle of the predetermined angle. If 828 is true, the jackknife prevention module 346 may generate an alert (e.g., audible and/or visual) at 836 when the difference between the angle and the predetermined angle is less than the second predetermined difference angle. The second predetermined difference angle may be calibratable and may be approximately 10 degrees or another suitable angle. While the example of FIG. 8 is shown as ending, the example of FIG. 8 may be illustrative of one control loop and control may return to 802.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An ultra-short range radar (USRR) system of a vehicle, comprising:
an object detection module configured to, based on radar signals from USRR sensors of the vehicle:
identify the presence of an object that is external to the vehicle;
determine a location of the object; and
determine at least one dimension of the object including at least one of a height, a length, and a width of the object; and
a remedial action module configured to, based on the location of the object and the at least one dimension of the object, at least one of:
selectively actuate an actuator of the vehicle;
selectively generate an audible alert via at least one speaker of the vehicle; and
selectively generate a visual alert via at least one light emitting device of the vehicle,
wherein:
the object is located one of: (i) in a bed of the vehicle; and (ii) on top of a roof of the vehicle;
the object detection module is further configured to determine a second height of an overhead object under which the vehicle will pass based on at least one of: the radar signals from the USRR sensors radar signals from other radar sensors of the vehicle, and images captured using one or more cameras of the vehicle; and
the remedial action module is configured to:
determine a third height based on the height of the object and a fourth height of the vehicle; and
apply one or more brakes of the vehicle when the second height of the overhead object is less than the third height.

2. The USRR system of claim 1 wherein:
the remedial action module is further configured to, when the third height is less than the second height of the overhead object by less than a predetermined amount, at least one of:
generate the audible alert via the at least one speaker of the vehicle; and
generate the visual alert via the at least one light emitting device of the vehicle.

3. The USRR system of claim 2 wherein the object detection module is configured to determine the second height of an overhead object under which the vehicle will pass based on all of: the radar signals from the USRR sensors, the radar signals from other radar sensors of the vehicle, and the images captured using one or more cameras of the vehicle.

4. An ultra-short range radar (USRR) system of a vehicle, comprising:
an object detection module configured to, based on radar signals from USRR sensors of the vehicle:
identify the presence of an object that is external to the vehicle;
determine a location of the object; and
determine at least one dimension of the object including at least one of a height, a length, and a width of the object; and
a remedial action module configured to, based on the location of the object and the at least one dimension of the object, at least one of:
selectively actuate an actuator of the vehicle;
selectively generate an audible alert via at least one speaker of the vehicle; and
selectively generate a visual alert via at least one light emitting device of the vehicle,
wherein:
the object detection module is configured to:
based on the radar signals from the USRR sensors:
determine a first location and a first height of a coupler of a trailer located behind the vehicle; and
determine a second location and a second height of a trailer hitch on the vehicle; and
the remedial action module is configured to, when the first height is less than the second height, at least one of:
generate the audible alert via the at least one speaker of the vehicle; and
generate the visual alert via the at least one light emitting device of the vehicle.

5. The USRR system of claim 4 wherein the remedial action module is configured to, when the first height is greater than the second height, selectively adjust steering and movement of the vehicle and adjust the second location toward the first location.

6. The USRR system of claim 5 wherein the remedial action module is configured to apply one or more brakes of the vehicle and stop the vehicle when trailer hitch is directly vertically below the coupler of the trailer.

7. The USRR system of claim 6 wherein the remedial action module is configured to, when trailer hitch is directly vertically below the coupler of the trailer, shift a transmission of the vehicle to park.

8. The USRR system of claim 7 wherein the remedial action module is configured to, when trailer hitch is directly vertically below the coupler of the trailer and the transmission is in park, at least one of:
generate the audible alert via the at least one speaker of the vehicle; and
generate the visual alert via the at least one light emitting device of the vehicle.

9. The USRR system of claim 4 wherein:
the object detection module is configured to determine whether the trailer hitch is present on the vehicle; and
the remedial action module is configured to, when the trailer hitch is not present on the vehicle, at least one of:
generate the audible alert via the at least one speaker of the vehicle; and
generate the visual alert via the at least one light emitting device of the vehicle.

10. The USRR system of claim 4 wherein the remedial action module is configured to, when the trailer is hitched to the vehicle and a transmission of the vehicle is in reverse, based on an angle between a first longitudinal axis of the trailer and a second longitudinal axis of the vehicle, at least one of:
selectively generate the audible alert via the at least one speaker of the vehicle; and
selectively generate the visual alert via the at least one light emitting device of the vehicle.

11. The USRR system of claim 10 wherein the remedial action module is configured to, when the angle between the first longitudinal axis and the second longitudinal axis is greater than a first predetermined angle and less than a second predetermined angle, at least one of:
   generate the audible alert via the at least one speaker of the vehicle; and
   generate the visual alert via the at least one light emitting device of the vehicle.

12. The USRR system of claim 11 wherein the remedial action module is configured to apply one or more brakes of the vehicle and stop the vehicle when angle between the first longitudinal axis and the second longitudinal axis is greater than the second predetermined angle.

13. The USRR system of claim 11 wherein the remedial action module is configured to:
   determine an angular change based on the angle between the first longitudinal axis and the second longitudinal axis and a previous value of the angle;
   based on the angular change, the angle, and a third predetermined angle that is greater than the second predetermined angle, determine an estimated period until the angle will reach the third predetermined angle; and
   when the estimated period is less than a predetermined period, at least one of:
     generate the audible alert via the at least one speaker of the vehicle; and
     generate the visual alert via the at least one light emitting device of the vehicle.

14. An ultra-short range radar (USRR) system of a vehicle, comprising:
   an object detection module configured to, based on radar signals from USRR sensors of the vehicle:
     identify the presence of an object that is external to the vehicle;
     determine a location of the object; and
     determine at least one dimension of the object including at least one of a height, a length, and a width of the object; and
   a remedial action module configured to, based on the location of the object and the at least one dimension of the object, at least one of:
     selectively actuate an actuator of the vehicle;
     selectively generate an audible alert via at least one speaker of the vehicle; and
     selectively generate a visual alert via at least one light emitting device of the vehicle,
   wherein:
     the object is located above the vehicle;
     the remedial action module is configured to, in response to a request to open a vertically opening rear door of the vehicle to a predetermined opening;
       determine whether the vertically opening rear door will contact the object while the vertically opening rear door is opening to the predetermined opening; and
       in response to determining that the vertically opening rear door will contact the object while the vertically opening rear door is opening to the predetermined opening, at least one of:
         generate the audible alert via the at least one speaker of the vehicle; and
         generate the visual alert via the at least one light emitting device of the vehicle.

15. The USRR system of claim 14 wherein the remedial action module is further configured to, in response to determining that the vertically opening rear door will contact the object while the vertically opening rear door is opening to the predetermined opening, not open the vertically opening rear door.

16. The USRR system of claim 14 wherein the remedial action module is further configured to, in response to determining that the vertically opening rear door will contact the object while the vertically opening rear door is opening to the predetermined opening, open the vertically opening rear door to an opening that is less than the predetermined opening.

17. The USRR system of claim 14 wherein the remedial action module is further configured to:
   determine whether the object is moving
     when the object is moving, whether the vertically opening rear door will contact the object while the vertically opening rear door is opening to the predetermined opening, and
   in response to determining that the vertically opening rear door will contact the object while the vertically opening rear door is opening to the predetermined opening, at least one of:
     generate the audible alert via the at least one speaker of the vehicle; and
     generate the visual alert via the at least one light emitting device of the vehicle.

18. A method for a vehicle, comprising:
   based on radar signals from ultra-short range radar (USRR) sensors of the vehicle:
     identifying the presence of an object that is external to the vehicle;
     determining a location of the object; and
     determining at least one dimension of the object including at least one of a height, a length, and a width of the object; and
   based on the location of the object and the at least one dimension of the object, at least one of:
     selectively actuating an actuator of the vehicle;
     selectively generating an audible alert via at least one speaker of the vehicle; and
     selectively generating a visual alert via at least one light emitting device of the vehicle;
   based on the radar signals from the USRR sensors:
     determining a first location and a first height of a coupler of a trailer located behind the vehicle; and
     determining a second location and a second height of a trailer hitch on the vehicle;
   when the first height is less than the second height, at least one of:
     generating the audible alert via the at least one speaker of the vehicle and
     generating the visual alert via the at least one light emitting device of the vehicle; and
   when the first height is greater than the second height, selectively adjusting at least one of steering and movement of the vehicle, thereby adjusting the second location toward the first location.

\* \* \* \* \*